(12) United States Patent
Lohmann

(10) Patent No.: US 6,766,882 B2
(45) Date of Patent: Jul. 27, 2004

(54) LOW LIFTING FLOOR CONVEYOR TRUCK

(75) Inventor: Helmut Lohmann, Gyhum Nartun (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 0 days.

(21) Appl. No.: 10/430,359

(22) Filed: May 6, 2003

(65) Prior Publication Data
US 2003/0213651 A1 Nov. 20, 2003

(30) Foreign Application Priority Data

May 14, 2002 (DE) .......................................... 102 21 311

(51) Int. Cl.$^7$ ................................................. B66F 9/06
(52) U.S. Cl. ........................ 187/231; 187/231; 414/662
(58) Field of Search ................................. 187/222, 231, 187/233, 237; 414/662, 663, 785; 198/468.8

(56) References Cited

U.S. PATENT DOCUMENTS

| | | | | |
|---|---|---|---|---|
| 2,650,733 A | * | 9/1953 | Blatz ........................... | 414/663 |
| 5,158,639 A | * | 10/1992 | Washizaki ................... | 414/662 |
| 5,468,116 A | * | 11/1995 | Reichert et al. ............. | 414/663 |
| 5,918,703 A | * | 7/1999 | Nordstrom ................... | 187/231 |
| 6,125,971 A | * | 10/2000 | Niebuhr et al. ............. | 187/231 |
| 6,309,168 B1 | * | 10/2001 | Holmes ....................... | 414/490 |
| 6,648,581 B2 | * | 11/2003 | Gibson ......................... | 414/663 |

FOREIGN PATENT DOCUMENTS

| | | |
|---|---|---|
| DE | 23 18 048 | 8/1978 |
| DE | 38 31 375 | 3/1990 |

* cited by examiner

*Primary Examiner*—James R. Bidwell
(74) *Attorney, Agent, or Firm*—Vidas, Arrett & Steinkraus P.A.

(57) ABSTRACT

Low-lifting floor conveyor truck, in which in a driving unit a driving wheel as well as a driving motor for the driving wheel are mounted and a steering appliance for the driving wheel, which is rotatable around a vertical axis, and at least one lifting cylinder are disposed, and in which further two parallel load arms are attached on a load unit, each of which being provided on the front end with one load wheel which on its part is beared in a rocker arm, the lifting cylinder acting upon the load unit and a linkage transmission is disposed between the driving unit and the rocker arm, which according to a lifting path of the lifting unit adjusts the rocker arm in height with respect to the load arms, and by doing this the load wheels also, a bearing component being linked to the upper end of the lifting cylinder, which is connected with the load unit via a screwed connection, the screwed connection in its detached state allowing for a limited relative displacement of bearing component and load unit.

5 Claims, 1 Drawing Sheet

LOW LIFTING FLOOR CONVEYOR TRUCK

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

Typically, a low lifting floor conveyor truck is provided with a driving unit and a load unit. The driving units bears the driving wheel, which is beared hingedly around a vertical axis and which can be coupled to a corresponding steering appliance, for instance a drawbar. Besides, the motor transmission arrangement as well as the lifting facility for the load unit is disposed in the driving unit. The lifting facility is mostly formed by one or two hydraulic lifting cylinders. The load unit, which normally accommodates the battery for the battery-operated electric motor, is connected to two wheel arms, which form the load fork. The wheel arms are supported on their free ends by load wheels, which on their part are beared on a rocker arm. The rocker arm co-operates with a linkage transmission, which is coupled to the driving unit on the other end, such that upon a height adjustment of the load unit the rocker arm is simultaneously adjusted also, in order to follow up the height movement of the wheel arms. The linkage transmission is mostly designed as a push or pull rod system.

With such linkage transmissions, there is the aspiration to provide an adjustment facility in order to compensate for larger tolerances in production. Because the kinematics is branched into two wheel arm systems, the asymmetries can be compensated by two adjustment facilities. The definite adjustment takes place only after the assembly. The objective of such an adjustment is to maintain the lowered height of the wheel arms in the region of the load wheels. This is particularly necessary when one gets into the pallets in the transverse direction.

It is known to undertake a linkage transmission adjustment with the aid of an eccentric. Another possibility consists in changing the linking of the reversing lever in its position with the aid of plain washers.

The disadvantages in the known systems consist in the increased times required for assembling and adjustment, which by far exceed the coast saving potential of a more coarse manufacture of the single components. Furthermore, the full cylinder lifting range can no more be utilised.

The invention has as an objective to provide a low lifting floor conveyor truck in which adjustment works for the wheel arm kinematics are omitted, but a full lifting range of the lifting cylinder is maintained anyway.

BRIEF SUMMARY OF TH INVENTION

In the invention, a bearing component is linked to the upper end of the lifting cylinder, which is connected with the load unit via a screwed connection, the screwed connection being designed such that it allows a limited relative displacement between bearing component and load unit in its detached state.

Advantageously the rocker arm is provided with a stopping face which co-operates with the bottom side of the load arm. In the lowered height position of the wheel arms the rocker arm rests on the stopping face. The lifting cylinder is supported by the driving unit. Thus, through a relative adjustment between the bearing component and the load unit upon the stopping of the load wheel rocker arm or the arrival of the load wheel on the downward position, respectively, a corresponding compensation can be carried out, before the screw connection is tightened. Preferably the screw connection is designed for non-positive transmission of the lifting forces.

According to one form of the invention, upon the rocker arm acts a push bar, which on its other end is linked to a reversing lever, which on its part is linked to the load unit and to the driving unit.

According to a further form of the invention, the piston rod of the lifting cylinder points in the downward direction and is accommodated in a pocket or the like of the driving unit in an approximately fitting manner. The component is linked to an endside eye of the lifting cylinder jacket.

Preferably the bearing component is an angular-shaped component, which is linked with one leg to one side of the lifting cylinder, and takes its rest against a support face of the load unit with the other leg. Preferably this leg, which has a panel-shaped design, is provided with at least one elongated hole for the purpose of relative adjustment between the bearing component and the load unit. The latter is then provided with a corresponding thread bore for the accommodation of the screw bolt.

In the inventive low lifting floor conveyor truck the lifting range of the lifting cylinder is completely utilised. The delineated adjustment of the linkage transmission preferably takes place at the end of the main assembly. Thereafter, no more adjustment is necessary.

BRIEF DESCRIPTION OF THE DRAWING

By means of an execution example represented in FIG. 1, the invention is clarified in more detail below.

DETAILED DESCRIPTION OF THE INVENTION

Figure 1:
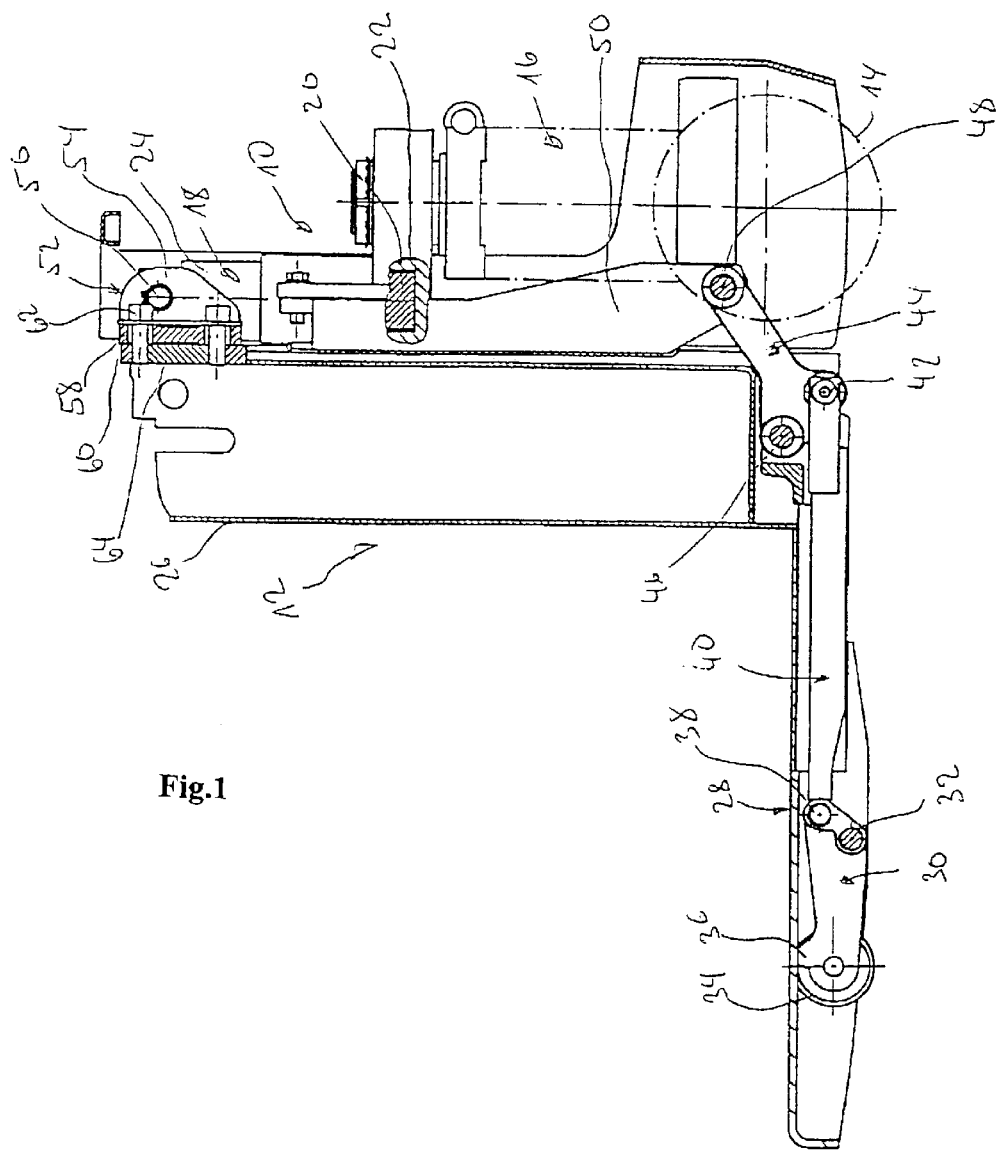

While this invention may be embodied in many different forms, there are described in detail herein a specific preferred embodiment of the invention. This description is an exemplification of the principles of the invention and is not intended to limit the invention to the particular embodiment illustrated The low lifting floor conveyor truck represented in the drawing is provided with a driving unit 10 and a load unit 12. The driving unit 10 bears a driving wheel 14 (drawn as a dot and dash line) which is hingedly mounted around a vertical axis. The driving takes place via a motor transmission unit 16 in the driving unit, which at the same time bears a hydraulic cylinder 18. The hydraulic cylinder 18 is provided with a piston rod 20, which is thrust into a complementary recess 22 of the frame of the driving unit 10. The cylinder jacket 24 of the hydraulic cylinder 18 points into the upward direction.

The load unit 12 is provided with a case 26 for the accommodation of a not shown battery. Two wheel arms are also fixed on the load unit 12, which form the load fork, one wheel arm 28 being recognisable. Inside of the wheel arm which is U-shaped in its cross section, a rocker arm 30 is hingedly mounted around a bearing spindle 32. The rocker arm 30 bears on its other end a load wheel 34, which is in a position in which it is maximally swivelled into the direction of the wheel arm 28. On the rocker arm 30 a stop 36 is formed, which co-operates with the bottom side of the wheel arm 28, as is recognisable in the drawing. On the same end as the bearing spindle 32, a push rod 40 is linked to the rocker arm 30 at 38. If a pressure in the leftward direction is exerted by the push rod 40 upon the rocker arm 30, the latter swings counter-clockwise and thus it can lift the wheel arm 28 with respect to the ground.

The push rod 40 is on its other end 42 linked to a reversing lever 44, which is linked to the load unit 12 at 46. An additional arm of the reversing lever 44 is at 48 linked to a cheek 50 of the driving unit 10 on the bottom end. It is appreciated that the described kinematics is also valid for the second wheel arm in the same manner. If the load unit 12 is lifted, it swivels the reversing lever clockwise and thus pushes the push rod against the rocker arm 30, which then on its part swings the load wheel in the counter-clockwise direction.

The lifting of the load unit 12 is caused by the hydraulic cylinder 18, which hingedly mounts a bearing part 52 on a not visible eye. The bearing part 52 is provided with a first panel-shaped leg 54, which extends sideways to the cylinder jacket 24 and is linked to the cylinder 18 via a bearing bolt 56. A leg 58 extending vertically to it is provided with two vertically stacked elongated holes 60, through which adjustment screw bolts 62 extend. The screw bolts are screwed into thread bores of a reinforced panel-shaped portion 64, which is provided on the upper backside end of the case 26. When the hydraulic cylinder 18 is extended, the load unit 12 with the wheel arms 28 is lifted. Simultaneously, the lowering and the swivelling of the rocker arm 30 takes place, as described.

It is appreciated that an additional bearing component 52 can be disposed on the opposing side of the cylinder 18 and can be connected with the case 26 in a similar manner.

The adjustment of the lifting kinematics takes place such that the rocker arm 30 with its stop 36 is brought to rest with the wheel arm 28. At this, the piston rod 20 in its inserted state should be seated on the bottom of the recess 22. If this is the case, the screw bolts 62 are tightened, and thus a non-positive junction exists between the cylinder 18 and the load unit 12 for the purpose of transferring the lifting forces to the load unit 12.

The above examples and disclosure rate intended to be illustrative and not exhaustive. These example and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. Low-lifting floor conveyor truck, in which in a driving unit a driving wheel as well as a driving motor for the driving wheel are mounted and a steering appliance for the driving wheel, which is rotatable around a vertical axis, and at least one lifting cylinder are disposed, and in which further two parallel load arms are attached on a load unit, each of which being provided on the front with one load wheel end which on its part is beared in a rocker arm, the lifting cylinder acting upon the load unit and a linkage transmission is disposed between the driving unit and the rocker arm, which according to a lifting path of the lifting unit adjusts the rocker arm in height with respect to the load arms, and by doing this the load wheels also, characterised in that a bearing component (52) is linked to the upper end of the lifting cylinder (18), which is connected with the load unit (12) via a screwed connection, the screwed connection in its detached state allowing for a limited relative displacement of bearing component (52) and load unit (12).

2. Low-lifting floor conveyor truck according to claim 1, characterised in that the rocker arm (30) is provided with a stopping face (36), which co-operates with the bottom side of the load arm (28).

3. Low-lifting floor conveyor truck according to claim 1, characterised in that upon the rocker arm (30) acts a push rod (40), which on its other end is linked to a reversing lever (44), which on its part is linked to the load unit (12) and to the driving unit (10).

4. Low-lifting floor conveyor truck according to claim 1, characterised in that the piston rod (20) of the lifting cylinder (18) points in the downward direction and is accommodated in a pocket (22) of the driving unit (10) in an approximately fitting manner, and that the bearing component (52) is linked to an endside eye of the lifting cylinder jacket (24).

5. Low-lifting floor conveyor truck according to claim 1, characterised in that the bearing component (52) is provided with a panel portion (58), which extends approximately in a direction transverse to the longitudinal axis of the floor conveyor truck, and is provided with at least one vertical elongated hole (60) for a screw bolt (62), which is screwable into a thread bore of a rest portion (64) of the load unit (12).

* * * * *